United States Patent [19]

Moore

[11] Patent Number: 4,704,991

[45] Date of Patent: Nov. 10, 1987

[54] LIVESTOCK WATERING SYSTEM

[75] Inventor: James G. Moore, Norman, Okla.

[73] Assignee: F.R.P. Industires, Inc., Norman, Okla.

[21] Appl. No.: 777,841

[22] Filed: Sep. 19, 1985

[51] Int. Cl.⁴ .............................................. A01K 7/00
[52] U.S. Cl. ..................................................... 119/73
[58] Field of Search ....................... 119/73, 74, 78, 79; 165/45

[56] References Cited

U.S. PATENT DOCUMENTS

| | | | |
|---|---|---|---|
| 1,035,179 | 8/1912 | Goellman | 119/78 |
| 1,476,095 | 12/1923 | Morgan | 119/73 |
| 1,839,595 | 1/1932 | Ritchie | 119/73 |
| 2,511,721 | 6/1950 | Langenbahn | 119/73 |
| 4,570,576 | 2/1986 | Noland et al. | 119/73 |

Primary Examiner—Robert P. Swiatek
Attorney, Agent, or Firm—Glen M. Burdick

[57] ABSTRACT

A livestock watering system is provided which is adapted to selectively circulate water in a basin in response to temperature differentials of the water in a lower reservoir portion of the basin and an upper drinking portion of the basin utilizing a thermal-siphon phenomenon. The livestock watering system comprises a housing, a basin supported by the housing (the basin being divided into an upper drinking portion and a lower reservoir portion), a flow control valve operably connected to a pressurized water source for maintaining a substantially constant level of water in the basin, a heating element adapted to selectively heat the water in the lower reservoir portion of the basin, and a temperature sensing assembly for sensing the temperature of the water in the basin. The temperature sensing assembly is operably connected to the heating element for selectively activating the heating element between one of an on mode and an off mode in response to the temperature of the water in the basin.

13 Claims, 6 Drawing Figures

LIVESTOCK WATERING SYSTEM

BACKGROUND OF THE INVENTION

1. Field of the Invention

The present invention relates to a livestock watering system, and more particularly, but not by way of limitation, to a livestock watering system adapted to selectively circulate water in response to the temperature of the water in the drinking basin so as to prevent freezing of the water during low temperature conditions.

2. Brief Description of the Prior Art

Providing a fresh supply of water for livestock in the winter season of the year when sub-freezing temperature conditions are encountered presents a difficult problem for ranchers and the like. Numerous systems have heretofore been suggested for providing a supply of fresh water for livestock when sub-freezing temperatures are encountered. One especially effective watering system heretofore known is the watering system disclosed in my co-pending patent application entitled "IMPROVED LIVESTOCK WATERING SYSTEM", U.S. Ser. No. 718,566, filed Apr. 1, 1985. The livestock watering system disclosed in pending patent application Ser. No. 718,566 comprises a housing, a drinking basin supported by the housing, a reservoir disposed within the ground so as to be positioned below the frost-line of the ground, and a water circulation assembly for selectively circulating water between the reservoir and the drinking basin. A flow control valve, disposed in a lower portion of the drinking basin, is connected to a pressurized water source such that a substantially constant level of water is maintained in the drinking basin. A temperature sensing assembly adapted to sense the temperature of the water in the drinking basin is operably connected to the water circulation assembly such that the water circulation system can be selectively activated between an on mode and an off mode in response to the temperature of the water in the drinking basin.

Typical of other prior art systems are the recirculating livestock watering system disclosed in U.S. Pat. No. 3,306,263 and the livestock watering station disclosed in U.S. Pat. No. 4,309,962.

While most of the prior art systems have incorporated various means to control the level of the water in a drinking basin, and/or for recirculating water between a drinking basin and a reservoir to prevent freezing of the water in the drinking basin during the winter, many of such prior art systems have possessed certain inherent problems in that such systems are expensive to operate due to the energy requirements of constantly circulating the water; and in many instances, such systems do not effectively prevent freezing of the water in the drinking basin when the water is exposed to low temperature conditions. In addition, many of the livestock watering systems heretofore known utilize complex mechanical structures requiring substantial maintenance.

SUMMARY OF THE INVENTION

The present invention provides a livestock watering system capable of preventing water in a drinking basin from freezing during low temperature conditions. Broadly, the livestock watering system comprises a housing, a basin supported by the housing, a partition for dividing the basin into an upper drinking portion and a lower reservoir portion while permitting water to circulate therebetween in response to a differential of temperature of water in the upper drinking portion and the lower reservoir portion of the basin, a heating assembly for selectively heating the water in the lower reservoir portion of the basin, a flow control valve, disposed in the lower reservoir portion of the basin, is connected to a pressurized water source such that a substantially constant level of water is maintained in the basin, and a temperature sensing assembly for sensing the temperature of the water in the basin and selectively activating the heating assembly in response to the temperature of the water in the basin.

An object of the present invention is to provide an improved livestock watering system.

Another object of the present invention, while achieving the before-stated object, is to provide a livestock watering system capable of preventing water from freezing in a drinking portion of the basin during subfreezing temperature conditions.

Another object of the present invention, while achieving each of the before-stated objects, is to provide a livestock watering system which is substantially maintenance free, economical to manufacture, and which does not suffer from the disadvantages of the prior art systems.

Other objects, advantages and features of the present invention will become clear upon reading the following detailed description in conjunction with tne drawings and appended claims.

DETAILED DESCRIPTION

Figure 1:
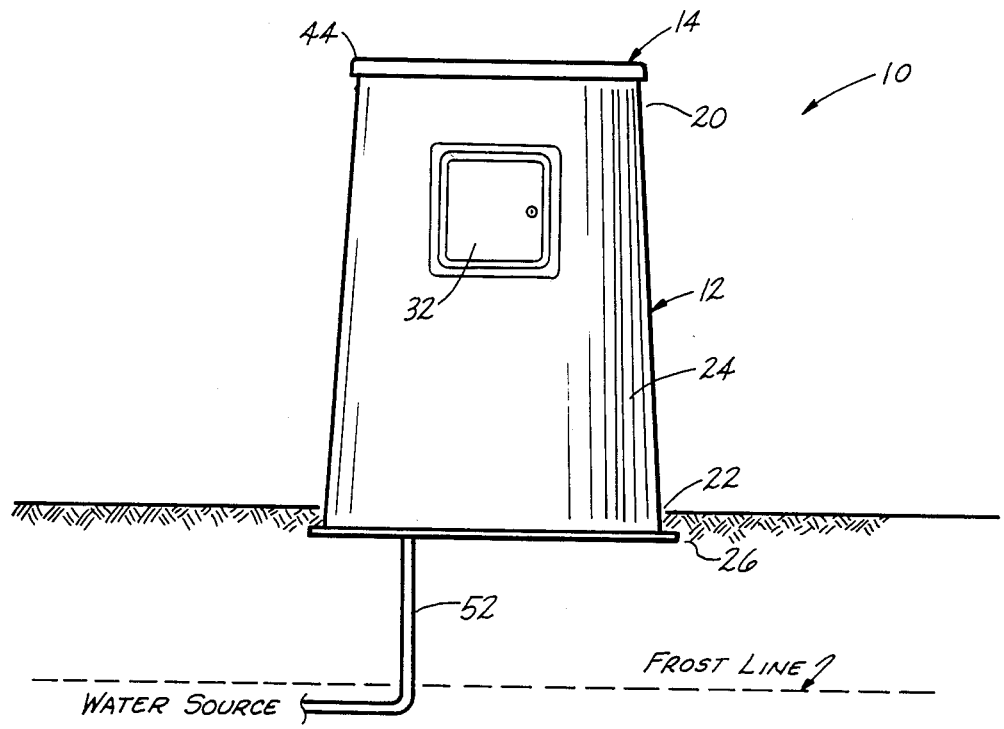
FIG. 1 is a front elevational view of the livestock watering system of the present invention.
Figure 2:
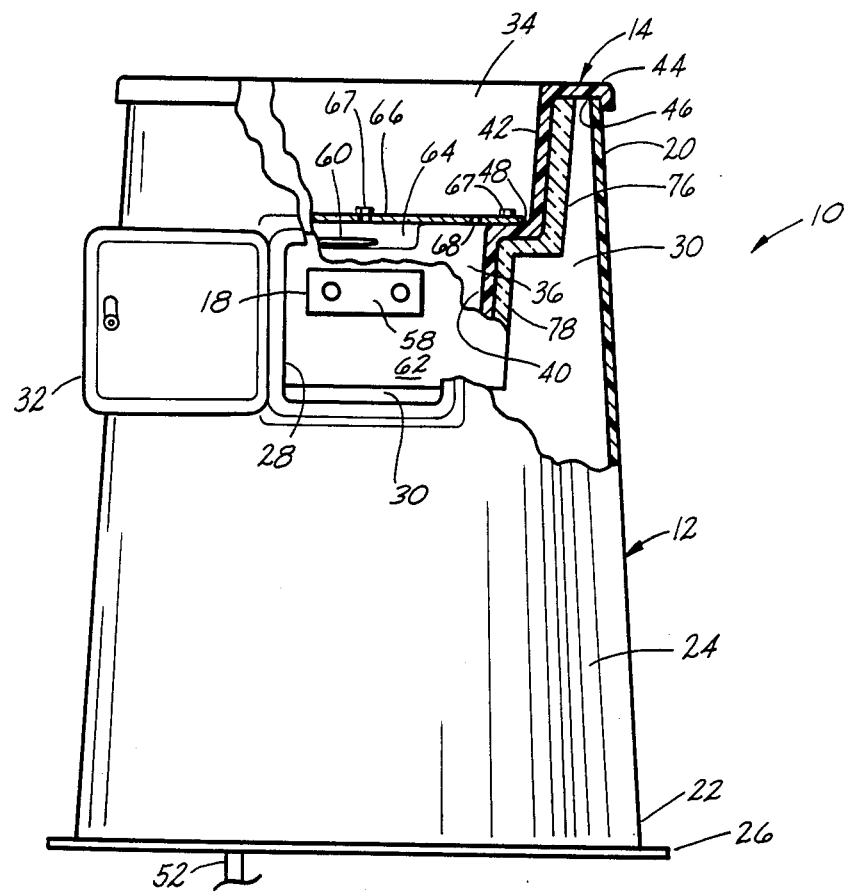
FIG. 2 is a partial cutaway, front elevational view of the livestock watering system of the present invention illustrating a door disposed on a sidewall thereof in an open position for permitting access to an interior portion of the housing of the system.
Figure 4:
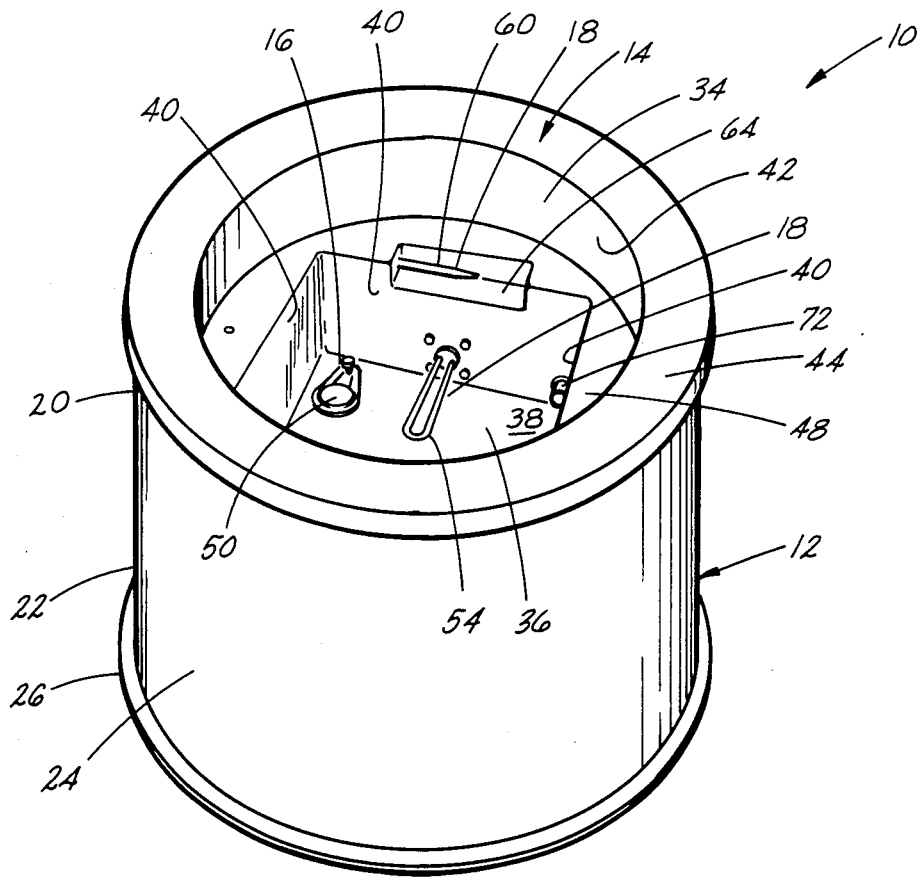
FIG. 4 is an upper plan view perspective of the livestock watering system of the present invention illustrating a drinking basin of the system having an upper drinking portion and a lower reservoir portion.

Referring to the drawings, and more specifically to FIGS. 1, 2 and 4, a livestock watering system 10 of the present invention is illustrated. The livestock watering system 10 comprises a housing 12, a basin 14, a flow control assembly 16 for maintaining a substantially constant level of water in the basin 14, and a temperature control assembly 18 for heating and controlling the temperature of the water in the basin 14 at a predetermined value when the livestock watering system 10 is exposed to sub-freezing temperature conditions.

The housing 12, illustrated as substantially cylindrical in cross-section, is provided with an upper end portion 20, a lower end portion 22 and a substantially continuous sidewall 24. The diameter of the lower end portion 22 of the housing 12 is greater than the diameter of the upper end portion 20. Thus, the continuous sidewall 24 of the housing 12 is inclined outwardly from the upper end portion 20 of the housing 12 to the lower end portion 22 thereof substantially as shown. A flange 26 is formed about the lower end portion 22 of the housing 12. The flange 26 provides a means for anchoring and stabilizing the livestock watering system 10. For example, the flange 26 can be buried below the surface of the ground to stabilize the livestock watering system 10 substantially as shown in FIG. 1; or the flange 26 can be bolted to a solid surface, such as a concrete slab, in a conventional manner.

An access opening 28 (see FIG. 2) is provided in the continuous sidewall 24 of the housing 12 so that access is permitted to a hollow interior portion 30 of the housing 12 for regulating and servicing the temperature control assembly 18, for draining water from the basin 14, and for servicing other components and elements of the livestock watering system 10 disposed within the housing 12. A door 32 is connected to the continuous sidewall 24 of the housing 12 such that the door 32 is movable between a closed, locked position wherein the door 32 seals the access opening 28 in the continuous sidewall 24 (substantially as shown in FIG. 1), and an open position wherein the door 32 permits access to the interior portion 30 of the housing 12 via the access opening 28 (substantially as shown in FIG. 2). Any suitable means, such as hinges and screws, can be used to connect the door 32 to the continuous sidewall 24 of the housing 12.

As more clearly shown in FIGS. 2-4 and 6, the basin 14 of the livestock watering system 10 is provided with an upper drinking portion 34 and a lower reservoir portion 36. The lower reservoir portion 36 is illustrated as a substantially rectangular shaped member having a closed bottom member 38 and sidewalls 40. The upper drinking portion 34 of the basin 14, which openly communicates with the lower reservoir portion 36, is illustrated as having a substantially circular configuration and is provided with a continuous sidewall 42 and an annular rim 44 which defines a lip 46. The upper drinking portion 34 and the lower reservoir portion 36 of the basin 14 are desirably fabricated as a unitary member such that a shoulder 48 is formed at the junction of the upper drinking portion 34 and the lower reservoir portion 36 of the basin 14.

The basin 14 is positioned within the housing 12 such that the annular rim 44 of the basin 14 engages and is supported by the upper end portion 20 of the housing 12, and the lip 46 of the basin 14 is disposed substantially adjacent and encircles the upper end portion 20 of the housing 12. The basin 14 can be secured to the housing 12, if desired, by connecting the lip 46 of the basin 14 to the upper end portion 20 of the housing 12 by any suitable means, such as adhesives, screws and the like.

Referring more specifically to FIG. 4, the flow control assembly 16 of the livestock watering system 10, which maintains a substantially constant level of water in the basin 14, comprises a flow control valve 50. The flow control valve 50 is disposed in the lower reservoir portion 36 of the basin 14 and is connected to a conduit 52 (see FIGS. 1 and 2) via an aperture (not shown) provided in the bottom member 38 of the lower reservoir portion 36. A fluid-tight seal is formed between the portion of the bottom member 38 surrounding the aperture and the portion of the flow control valve 50 extending through the aperture in the bottom member 38 of the lower reservoir portion 36 of the basin 14. Any suitable means can be emplyed to form the fluid-tight seal, such as gaskets, fiberglass, epoxy resin materials and the like.

One end of a pressurized water supply conduit 52 is connected to the flow control valve 50 so that water can be discharged into the basin 14 via the pressurized water supply conduit 52 when the flow control valve 50 is in an open position; and the other end of the pressurized water supply conduit 52 is connected to a pressurized water source (not shown). In order to prevent the water in the pressurized water supply conduit 52 from freezing when sub-freezing temperature conditions are encountered, the pressurized water supply conduit 52 is buried in the ground below the frost line and the end portion connected to the flow control valve 50 extends upwardly into the housing 12. If desired, the portion of the pressurized water supply conduit 52 extending upwardly into the housing 12 can be insulated with insulation materials well known in the art.

Any suitable valve which is actuated between an open position and a closed position in response to the amount of water disposed above the valve can be employed as the flow control valve 50 of the livestock watering system 10 of the present invention. The use of such a flow control valve insures that a substantially constant level of water is maintained in the upper drinking portion 34 of the basin 14 at all times. While any suitable valve having the before-mentioned features can be used as the flow control valve 50 in the livestock watering system 10 of the present invention, desirable results have been obtained where the flow control valve 50 is a Freeland Free-Flo heavy duty livestock watering valve manufactured by J. H. Industries, Inc. for Freeland Industries, Inc., Portage, Wis. 53901.

Figure 6:
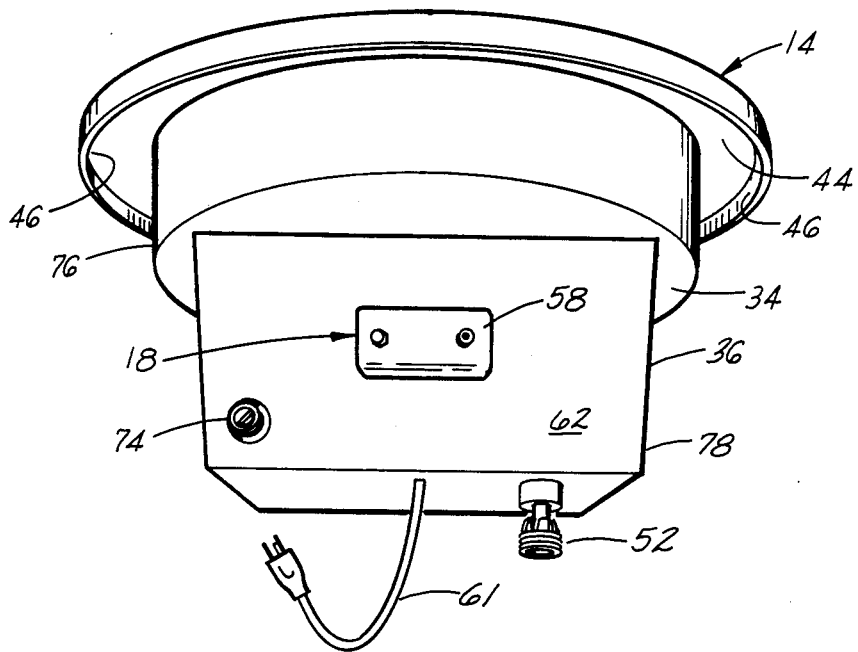
FIG. 6 is a partial cross-sectional side elevational view of the basin of the livestock watering system of the present invention, illustrating insulation disposed about an exterior surface of the basin.

Referring now to FIGS. 2, 4 and 6, the temperature control assembly 18 of the livestock watering system 10, which is adapted to heat and control the temperature of the water in the basin 14 when the livestock watering system 10 is exposed to sub-freezing temperature conditions, comprises a heater element 54 and a temperature sensing and control assembly, such as thermostat 58 having a temperature sensing element or probe 60 operably connected thereto. The heater element 54 is disposed within the lower reservoir portion 36 of the basin 14 and is adapted to selectively heat the water in the basin when the heater element is placed in an on mode in response to the temperature of the water in the basin 14 as sensed and measured by the temperature sensing element or probe 60. The heater element 54 is operably connected to the thermostate 58 in a conventional manner, such as through an aperture (not shown) provided in one of the sidewalls 40 of the lower reservoir portion 36 of the basin 14. A fluid-tight seal is formed between the sidewall 40 of the lower reservoir portion 36 and the heater element 54 by any suitable means, such as gaskets, fiberglass, epoxy resin materials and the like.

Any heater element capable of efficient operation when submerged in water can be employed as the heater element 54 of the livestock watering system 10 of the present invention. However, especially desirable results have been employed wherein the heater element 54 is a Dayton Screw-In Water Heater Element, 1500 watts, 120 volt, 60 Hz, manufactured by Dayton Electric Manufacturing Company of Chicago, Ill.

The temperature sensing assembly of the temperature control assembly 18, (i.e. the thermostat 58 of the temperature sensing element or probe 60) is adapted to sense the temperature of the water in the drinking basin 14 and activate the heater element 54 in response to the temperature of the water. The thermostat 58, which is connected to a suitable power source (not shown) via electrical cable 61, is mounted in a convenient location within the housing 12, such as on an exterior surface of the lower reservoir portion 36 of the basin 14, so as to be readily accessible through the access opening 28 of the housing 12 when the door 32 is in the open position. Thus, one is provided ready access to the thermostat 58 for adjusting the operating range of the thermostat 58 as desired.

The temperature sensing probe 60 of the thermostat 58 is positioned within the basin 14 of the livestock watering system 10 so as to be in constant contact with the water contained therein. Desirably, the temperature sensing probe 60 is positioned within a recessed portion 64 formed in the shoulder 48 of the basin 14 substantially as shown in FIG. 4.

The temperature sensing probe 60 is adapted to sense the temperature of the water in the drinking basin 14 and to send a signal to the thermostat 58 representative of the sensed temperature of the water within the basin 14. When the sensed temperature is determined to be below a predetermined value, the thermostat 58 activates the heater element 54 so that the water in the basin 14 is heated. When the temperature in the drinking basin 14 has again reached the predetermined temperature value, as sensed by the temperature sensing probe 60, the thermostat 58 opens the electrical circuit to the heater element 54 so that no further power is directed to the heater element 54. Thus, the connection of the heater element 54 through the thermostat 58 allows one to selectively heat the water in the basin 14 when low temperature conditions are encountered to prevent the water from freezing in the basin 14.

Any suitable thermostat having a temperature sensing probe and which is capable of switching the heater element 54 between the on mode and off mode, and desirably having an adjustable differential, can be used as the temperature sensing assembly of the temperature control assembly 18 of the livestock watering system 10 of the present invention. However, desirable results have been achieved, wherein the temperature sensing assembly of the temperature control assembly 18 is a Series A19 temperature control, single-pole, double-throw model thermostat manufactured by Johnson Controls, Inc., 1302 East Monroe Street, Goshen, Ind. 46526.

The unique design of the basin 14 of the livestock watering system 10 of the present invention, together with heat exchange principles, provides a thermal-siphon phenomenon which enables the water in the basin 14 to be circulated between the lower reservoir portion 36 and the upper drinking portion 34 of the basin 14 in response to a differential of temperature of the water in the upper drinking portion 34 and the lower reservoir portion 36 of the basin 14. The thermal-siphon phenomenon is based upon principles of heat transfer, namely (a) that the greatest heat loss of a body of water occurs at the surface of the body of water; and (b) that cold water is heavier than warm water. Thus, by heating the water in the lower reservoir portion 36 of the basin 14 the heated water has a tendency to rise to the upper drinking portion 34 of the basin 14, and the water cooled on the surface in the upper drinking portion 34 of the basin 14 has a tendency to migrate to the lower reservoir portion 36. This thermal migration of the water in the basin 14 provides in the thermal-siphon phenomenon and insures that the water is constantly circulated between the upper drinking portion 34 and the lower reservoir portion 36 of the basin 14 when the livestock watering system 10 is exposed to sub-freezing temperature conditions and the heater element is activated to its on mode by the temperature sensing assembly 56.

Figure 3:
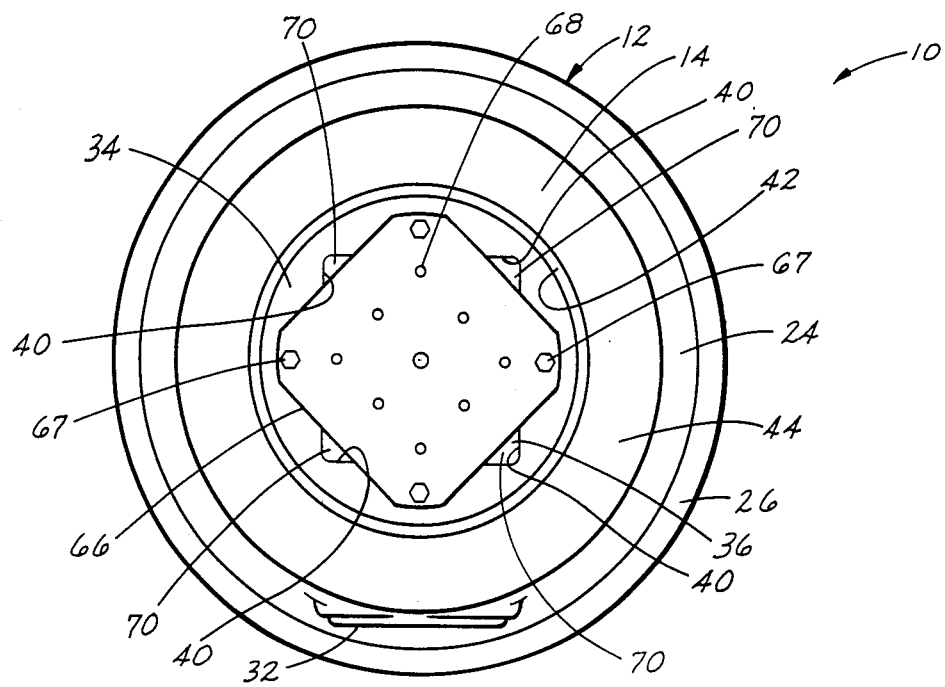
FIG. 3 is a top plan view of the livestock watering system of the present invention.
Figure 5:
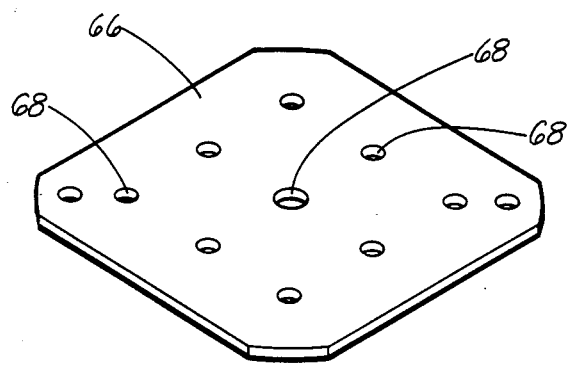
FIG. 5 is an isometric view of a partition member for separating the upper drinking portion of the basin from the lower reservoir portion while permitting water to be circulated therebetween.

As a safety feature for animals drinking water from the upper drinking portion 34 of the basin 14 of the livestock watering system 10 of the present invention, a partition member 66 is supported by and secured to the shoulder 48 by any suitable means, such as screws 67 (see FIGS. 2 and 3). The partition member effectively separates the upper drinking portion 34 of the basin 14 from the lower reservoir portion 36 of the basin 14 and prevents the animal from undesirably contacting the flow control valve 50, the heater element 54 and the temperature sensing probe 60. However, to permit the thermalsiphon phenomenon to effectively circulate the water in the basin 14 between the lower reservoir portion 36 and the upper drinking portion 34 thereof the partition member 66 must be provided with a plurality of openings or apertures 68 or be sufficiently porous to allow the water to effectively circulate between the upper drinking portion 34 and the lower reservoir portion 36. Any suitable material having the before-mentioned characteristics can be employed as the partition member 66 of the livestock watering system 10 to effectively separate the upper drinking portion 34 of the basin 14 from the lower reservoir portion 36. However, one especially desirable configuration is the configuration of the partition member 66 illustrated in FIGS. 3 and 5. The partition member 66 is provided with a plurality of apertures 68 extending therethrough for providing unrestricted flow of the water between the upper drinking portion 34 and the lower reservoir portion 36 of the basin 14. Further, the partition member 66 is desirably positioned on the shoulder 48 of the basin 14 such that an unrestricted flow path is provided at four additional locations (indicated by the numeral 70) around the periphery of the partition member 66 substantially as shown in FIG. 3.

In order to permit the water to be removed from the basin 14 an aperture (not shown) is provided in the lower reservoir portion 36 of the basin 14 so as to be in close proximity to the bottom member 38. One end of a conduit 72 (see FIG. 4) is inserted into the aperture and sealed within the aperture by any suitable means, such as fiberglass, epoxy resin materials and the like so that a fluid-tight seal is formed between the conduit 72 and the portion of the sidewall 40 of the lower reservoir portion 36 surrounding the aperture. A valve 74 (see FIG. 6) is connected to the other end portion of the conduit 72. The valve 74 has an open mode and a closed mode. When the valve 74 is positioned in the open mode water can be drained from the basin 14; whereas when the valve 74 is in the closed mode the conduit 72, and thus the basin 14, are effectively sealed. Any suitable two-way valve well known in the art can be employed as the valve 74. However, it is desirable that the valve 74 have a threaded male connector portion so that the threaded male conector portion can be connected to a female connector portion of a hose or conduit so that water can be removed from the basin 14 and discharged at a location exterior of the housing 12 of the livestock watering system 10.

Referring now to FIGS. 2 and 6, in order to improve the efficiency of the livestock watering system 10 of the present invention, a layer of insulation material 76 is positioned about and secured to an exterior surface of the upper drinking portion 34 of the basin 14; and a layer of insulation material 78 is positioned about and secured to an exterior surface of the lower reservoir portion 36 of the basin 14 substantially as shown in FIGS. 2 and 6. Any suitable insulation well known in the art can be employed as the insulation materials 76 and 78, and such insulation materials can be secured to the exterior surfaces of the upper drinking portion 34 and the lower reservoir portion 36 of the basin 14 by conventional techniques well known in the installation art. However, especially desirable results have been employed wherein the insulation materials employed are provided with a reflective backing material, such as aluminum foil, and each junction of the insulation materials is sealed with a tape material to insure that the exterior side portions of the basin 14 are substantially encased with the insulation materials 76 and 78 heretofore described.

The livestock watering system 10 of the present invention was placed in a walk-in freezer maintained at a temperature of about −20 degrees Fahrenheit. The basin 14 was filled with water and the thermostat 58 was set for a controlled temperature of 70 degrees Fahrenheit. A thermometer was placed in the upper drinking portion 34 of the basin 14 and secured in a stable position. The livestock watering system 10 was maintained in the environs of about −20 degrees Fahrenheit for a period of twenty-four hours, and periodic readings of the thermometer were made. These observations revealed that the temperature of the water in the upper drinking portion 34 of the basin 14 was maintained at approximately 70 degrees Fahrenheit throughout the twenty-four hour period, even though the temperature of the environment was about −20 degrees Fahrenheit and that the thermosiphon phenomenon effectively circulated the water between the lower reservoir portion 36 of the basin 14 and the upper drinking portion 34 of the basin 14.

The livestock watering system 10 of the present invention can be fabricated of any suitable material. However, desirable results have been obtained wherein the partition member 66 is fabricated of high-density polypropylene, and the housing 12 and the basin 14 are fabricated of shock-proof, reinforced fiberglass materials so that the system is resistant to the formation of algae and will be capable of absorbing shock and force created by large animals, such as cattle and horses, bumping the housing 12.

It is clear that the present invention is well adapted to carry out the objects and attain the ends and advantages mentioned herein as well as those inherent in the invention. While presently preferred embodiments of the invention have been described for purposes of this disclosure, numerous changes may be made which will readily suggest themselves to those skilled in the art and which are accomplished within the spirit of the invention disclosed and as defined in the appended claims.

What is claimed is:

1. A livestock watering system comprising:
   a housing having an upper end portion, a lower end portion and a continuous sidewall;
   a basin supported by the upper end portion of the housing, said basin having an upper drinking portion and lower reservoir portion;
   partition means supported within the basin for separating the upper drinking portion from the lower reservoir portion, the partition means permitting the water to flow therethrough as same is circulated between the lower reservoir portion and the upper drinking portion in response to the differential of temperature of the water in the basin;
   shoulder means formed at the junction of the upper drinking portion and the lower reservoir portion for supporting the partition means, the shoulder means having a recessed portion formed therein;
   flow control means for maintaining a substantially constant level of water in the basin;
   heating means disposed within the lower reservoir portion of the basin for selectively heating the water in the lower reservoir portion of the basin; and
   temperature sensing means for sensing the temperature of the water in the basin, said temperature sensing means operably connected to the heating means for selectively activating the heater means between one of an on mode and an off mode in response to the temperature of the water in the basin so that water is circulated between the upper drinking portion and the lower reservoir portion in response to a differential of temperature of water in the upper drinking portion and the lower reservoir portion of the basin, said temperature sensing means comprising:
      a thermostat having a temperature sensing probe, the temperature sensing probe being supported within the recessed portion in the shoulder means of the basin so as to be in contact with water contained in the reservoir portion of the basin in close proximity to the partition means.

2. The livestock watering system of claim 1 wherein the upper drinking portion of the basin is provided with a substantially circular configuration having a continuous sidewall and an annular rim formed along an upper portion of the sidewall, the annular rim being adapted to be supported on the upper end portion of the housing, and wherein the lower reservoir portion of the basin is provided with sidewalls and a closed bottom member.

3. The livestock watering system of claim 2 further comprising:
   a valve assembly supported within the lower reservoir portion of the basin so as to be in close proximity to the closed bottom member, the valve assembly having an open position and a closed position such that when the valve assembly is in the open position the water in the basin can be drained therefrom via the valve assembly.

4. The livestock watering system of claim 1 wherein the housing is provided with an access opening formed in the sidewall thereof and wherein the livestock watering system further comprises:
   a door assembly connected to the sidewall of the housing, the door assembly movable between a first position and a second position, in the first position the door assembly sealing the access opening and in the second position the door assembly permitting access to an interior portion of the housing via the access opening.

5. The livestock watering system of claim 4 further comprising:
   flange means formed on the lower end portion of the housing for stabilizing the housing.

6. The livestock watering system of claim 4 further comprising:
   insulation means disposed about an exterior surface of the drinking basin for restricting heat loss from water in the basin.

7. A livestock watering system comprising:
   a housing having a substantially hollow interior portion;
   a basin supported by the housing so as to extend into the hollow interior portion of the housing, said basin characterized as having an upper drinking portion and a lower reservoir portion;
   partition means supported within the basin for separating the upper drinking portion of the basin from the lower reservoir portion of the basin, the partition means having a plurality of fluid flow apertures extending therethrough such that water in the basin can flow therethrough when the water is thermal-siphonally circulated between the upper drinking portion and lower reservoir portion of the basin;
   shoulder means formed at the junction of the upper drinking portion and the lower reservoir portion for supporting the partition means, the shoulder means having a recessed portion formed therein;
   flow control means disposed in a lower portion of the lower reservoir portion of the basin and connected to a pressurized water source for maintaining a substantially constant level of water in the basin;
   a heater element disposed within the lower reservoir portion of the basin; and
   temperature sensing means for sensing the temperature of the water in the basin, the temperature sensing means operably connected to the heater element and selectively activating the heater element between one of an on mode and an off mode in response to the temperature of the water in the basin, so that water is thermal-siphonally circulated between the upper drinking portion and the lower reservoir portion in response to a differential of temperature of water in the upper drinking portion and the lower reservoir portion of the basin, said temperature sensing means comprising:
      a thermostat having a temperature sensing probe, the temperature sensing probe being supported within the recessed portion in the shoulder means of the basin so as to be in contact with water contained in the reservoir portion of the basin in close proximity to the partition means.

8. The livestock watering system of claim 7 wherein the housing is provided with an access opening in a side portion thereof, and wherein the livestock watering system further comprises:
   a door assembly connected to the housing, the door assembly movable between a first position and a second position, in the first position the door assembly sealing the access opening and in the second position the door assembly permitting access to the hollow interior portion of the housing via the access opening.

9. The livestock watering system of claim 7 further comprising:
   insulation means disposed about an exterior surface of the drinking basin for restricting heat loss from water in the basin.

10. The livestock watering system of claim 9 further comprising:
    a valve assembly fluidly communicating with the lower reservoir portion of the basin for selectively draining water from the basin.

11. The livestock watering system of claim 10 wherein the housing is characterized has having an upper end portion and a lower end portion, and wherein the livestock watering system further comprises:
    flange means formed on the lower end portion of the housing for stabilizing the housing.

12. The livestock watering system of claim 11 wherein the thermostat is connected to an exterior portion of the lower reservoir portion of the basin so as to be disposed in a facing relationship with the access opening formed in the housing.

13. The livestock watering system of claim 12 wherein the upper drinking portion of the basin is provided with a substantially circular configuration having a continuous sidewall and an annular rim formed along an upper portion of the sidewall, the annular rim being adapted to be supported on the upper end portion of the housing, and wherein the lower reservoir portion of the basin is provided with a substantially rectangular shaped configuration formed of a plurality of sidewalls and a closed bottom member.

* * * * *